UNITED STATES PATENT OFFICE.

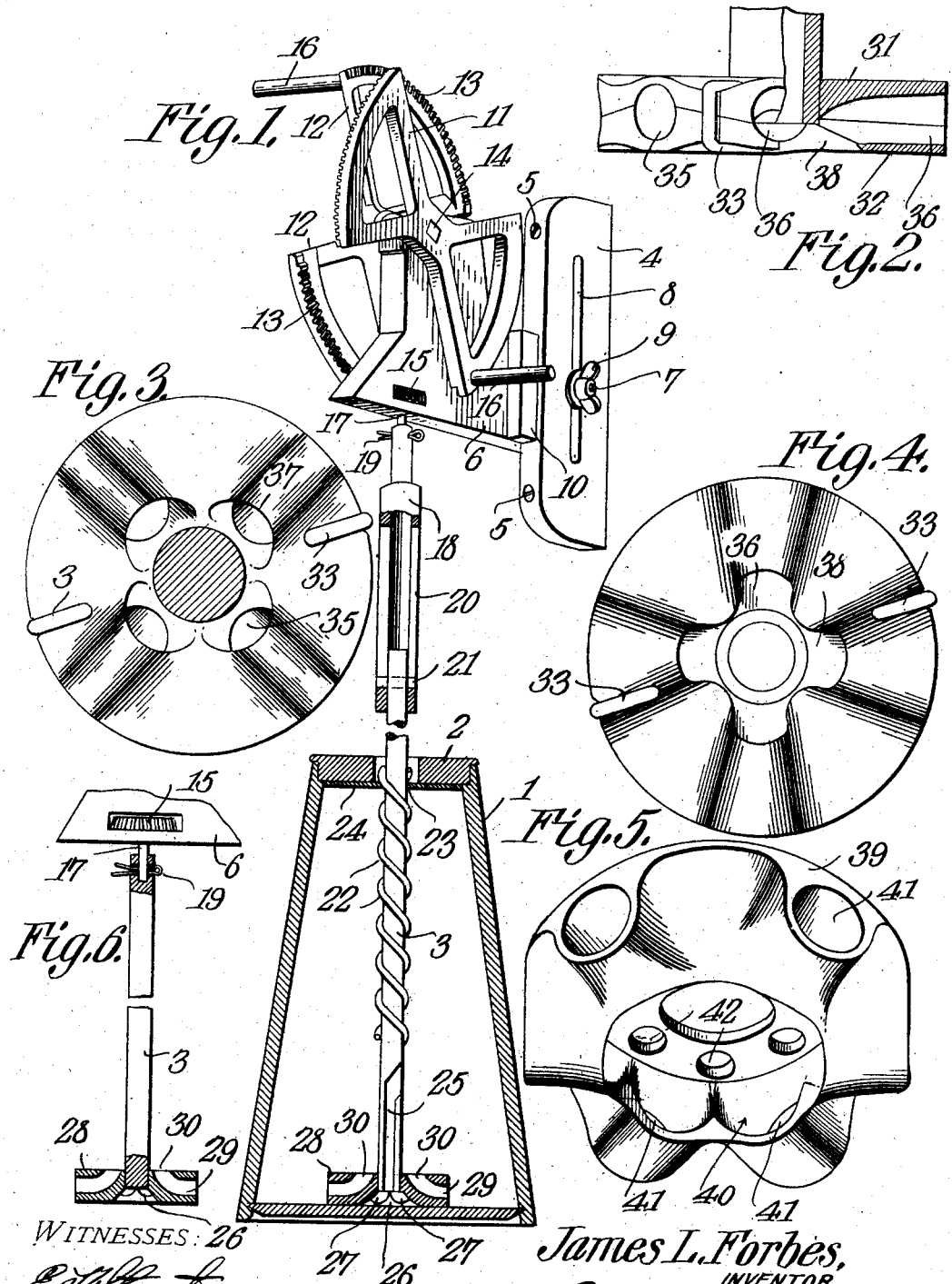

JAMES L. FORBES, OF LAGRANGE, GEORGIA.

CHURN.

No. 865,030.

Specification of Letters Patent.

Patented Sept. 3, 1907.

Application filed November 22, 1906. Serial No. 344,626.

*To all whom it may concern:*

Be it known that I, JAMES L. FORBES, a citizen of the United States, residing at Lagrange, in the county of Troup and State of Georgia, have invented a new and useful Churn, of which the following is a specification.

This invention relates to improvements in churns of that type set forth in the U. S. Letters Patent #817,310, granted to me on the tenth day of April, 1906, which operate on the principle of introducing air into the milk during the agitation of the latter by the dasher, so as to assist in collecting the butter particles from the milk.

The invention has for one of its objects to improve and simplify the construction and operation of churns of this class so as to be efficient and reliable in use, and capable of thoroughly agitating and aerating the milk, so that butter can be quickly formed.

A further object of the invention is to improve the construction of the churn dasher whereby air can be introduced into milk in an efficient and satisfactory manner.

A further object of the invention is the provision of a simple form of driving mechanism for the churn dasher whereby the latter is alternately rotated in opposite directions by a driving element rotating continuously in one direction, in connection with a wall bracket for adjustably supporting the driving mechanism.

With these objects in view, and others, as will appear as the nature of the invention is better understood, the invention comprises the various novel features of construction and arrangement of parts, which will be more fully described hereinafter, and set forth with particularity in the claims appended hereto.

In the accompanying drawing, which illustrates certain of the embodiments of the invention, Figure 1 is a perspective view of the churn showing the tub thereof in section and one form of dasher. Fig. 2 is a side elevation, partially in section, of another form of dasher. Fig. 3 is a plan view of the top thereof. Fig. 4 is a bottom plan view of a modified form of dasher. Fig. 5 is a perspective view of a further form of dasher. Fig. 6 is a detail view showing a dasher which is adapted to have only a back and forth rotary movement, instead of a combined back and forth and vertically reciprocating movement, as is the case with the dasher shown in Fig. 1.

Corresponding parts in the several figures are indicated throughout by similar characters of reference.

Referring to the drawing, and more particularly to Fig. 1, 1 designates the milk holder, which is preferably in the nature of a barrel having a removable closure or top 2 in which is mounted the dasher shaft 3. The mechanism for rotating the dasher shaft is supported above the barrel 1 in any suitable manner, as, for instance, by means of a bracket 4 which is secured to the wall of a room or to any other suitable structure by screws 5. To this bracket is adjustably attached an arm 6 secured in place by a bolt 7 that extends through the arm and through the vertically disposed slot 8 of the bracket, a wing nut 9 being provided for permitting the bolt to be readily drawn up or loosened for adjusting the vertical position of the arm. The arm 6 is provided with a cleat 10 which engages the outer vertical edge of the bracket 4 so as to prevent the arm from turning about the bolt 7 as a pivot.

The actuating mechanism comprises a rotatable element mounted on the bracket, which element preferably takes the form of two sets of quadrant-shaped frames 11 and 12. The frames of each set are disposed diametrically opposite each other and the two sets are arranged ninety degrees displaced from each other. These frames are provided with sector-shaped racks 13, thereby constituting the rotating element a mutilated gear. The frames 11 are spaced apart from the frames 12 and are mounted on a short horizontal shaft 14 journaled on the arm 6 and having squared ends to receive the said frames.

Mounted on the arm 6 to rotate on a vertical axis is a pinion 15 arranged to mesh alternately with the gear teeth 13 of the frames 11 and 12, so that by one rotation of the mutilated gear, the pinion will rotate first in one direction and then in the opposite direction, or, in other words, the pinion reverses its direction of rotation four times during one revolution of the mutilated gear. The mutilated gear and pinion, which may be made of aluminium or any other suitable material, being supported on the bracket, are adjustable to any desired height on the latter. The two sections of the mutilated gear are disposed on opposite sides of the arm 6, and each section is provided with a crank or handle 16 whereby the mutilated gear can be rotated by one, or both hands, as desired.

With some forms of dashers, a simple back and forth rotary movement is required, and in this case the dasher shaft 3 is detachably connected directly to the spindle 17 of the pinion 15, as shown in Fig. 6. When a dasher is employed, which is designed to have a combined back and forth rotary movement and vertical reciprocation, the dasher shaft 3 is connected with the pinion spindle 17 by a sleeve 18, or equivalent means, to which the shaft 3 is feathered, as shown in Fig. 1. The spindle 17 is connected with the shaft 3 or sleeve 18 by a cotter pin 19 which permits the parts being readily detached or connected, as when the dasher is to be taken out or replaced in the churn barrel. Any suitable means may be employed to permit the shaft 3 to move longitudinally in the sleeve 18, as, for instance, the sleeve is provided with slots 20 in which the pin 21 in the upper end of the dasher shaft 3 slides up and down. To cause the shaft to reciprocate, the threads 22 are provided on the shaft 3 which engage with recesses 23 of the plate 24, so that as the shaft rotates, the threads will produce longitudinal movement.

The dasher of the churn is preferably made of aluminium, kaolin, earthen ware, or other material, which may be cast, or otherwise suitably molded, to the proper shape. Several forms of dashers have been shown in the present instance, all of which embody the principle of causing air to be introduced into the milk during the churning action. These dasherse may be used in connection with a dasher shaft which is solid, such as that shown in Fig. 6, or they may be used in connection with a dasher shaft such as that shown in Fig. 1, wherein a central air passage 25 is formed in the lower end of the dasher, so as to permit air to pass to the central opening on the underside of the dasher, as will be readily understood from applicant's patent hereinbefore referred to. In the dasher shown in Fig. 1, the same comprises a disk-shaped body having a central opening 26 from which extend a plurality of radial passages 27 terminating at the circumference of the body 28. In addition to these, a pair of oppositely disposed radial passages 29 are provided, which turn upwardly at their inner ends and open at 30 in the top surface of the body 28. During the reciprocation and rotation of the dasher, the milk is discharged outwardly through the passages 27 and 29 with a certain proportion of air, so that the milk is rendered in the best condition to assist in the formation of the butter.

According to the modified form of dasher shown in Figs. 2 to 4, inclusive, the dasher is composed of two sections 31 and 32 which are divisible in a plane transverse to the axis of rotation. These two sections are secured together in any suitable manner, as, for instance, by spring clips 33, and the sections are made divisible for the purpose of facilitating the cleansing of the dasher. The dasher is provided with two sets of radially extending passages 35 and 36, the two sets of passages being arranged in staggered relation, so that the outer ends of the passages, as shown in Fig. 2, are arranged in alternate relation. The passages 35 open upwardly at their inner ends through openings 37 on the top side of the dasher, as shown in Fig. 3, while the passages 36 terminate at their inner ends in a common opening 38 shown in Figs. 2 and 4, which opening or chamber opens downwardly at the center of the dasher. The top and bottom surfaces of the dasher are corrugated, or otherwise suitably formed, so as to assist in the churning action. With this form of dasher, a plurality of streams are discharged outwardly from the top and bottom sides of the dasher, so that a thorough agitation and mixing of air with the milk is produced.

Referring to Fig. 5, the dasher comprises a disk-shaped body 39 having a central chamber 40 that opens downwardly and from which radiate a plurality of passages 41. The under surface of the body 39 is cut away at the regions between the passages, so that alternate hollows and raised portions are produced. The top surface of the body is provided with a central opening for receiving the dasher shaft and around this opening are a plurality of apertures 42 whereby air can be admitted to the chamber 40.

From the foregong description, taken in connection with the accompanying drawing, the advantages of construction and of the method of operation will be readily understood by those skilled in the art to which the invention appertains, and while I have described the principle of operation of the invention, together with the apparatus which I now consider to be the best embodiment thereof, I desire to have it understood that the apparatus shown is merely illustrative, and that various changes may be made, when desired, as are within the scope of the claims.

What is claimed is:—

1. In a churn, the combination with a suitable receptacle, and a dasher mounted to rotate therein, of operating mechanism embodying a bracket adapted to be secured to a suitable support, an arm adjustable vertically relative to said bracket, and operating devices supported on the said arm and operatively connected to the dasher of the churn.

2. In a churn, the combination with a suitable receptacle, a dasher mounted to rotate therein, and means for reciprocating the dasher on its axis during the rotary movement thereof, of operating devices for the dasher embodying a rotary member having its axis arranged in alinement with that of the dasher, devices for operatively connecting said member and dasher and permitting reciprocatory movement of the latter, means coöperating with said rotary member for driving the dasher, and a bracket for supporting the dasher operating mechanism capable of permitting a relatively vertical adjustment thereof.

3. In a churn, the combination with a suitable receptacle, a dasher mounted to turn therein, and means for reciprocating the churn dasher on its axis during its rotary movements, of operating means for the dasher embodying a rotary member, a sleeve operatively connected to the latter having a longitudinal slot therein, and a pin on a part movable with the dasher and arranged to coöperate with the slot of said sleeve for operatively connecting the rotary member and the dasher irrespective of the relative axial movements of the dasher.

4. The combination of a receptacle, a rotatable dasher mounted therein, said dasher comprising a body having a central opening in its bottom with sets of alternately arranged radial passages extending therefrom, one of said sets being provided with air admitting conduits open at the top side of the dasher.

5. In a churn, the combination with a suitable receptacle, of a dasher embodying a head provided with sets of alternately arranged radial discharge passages, the inner ends of one set of the latter having an opening at the upper side of the head and the other set opening at the bottom thereof, and means for imparting rotary and reciprocatory movements to the dasher.

6. In a churn, a dasher having a central chamber opening downwardly, a set of conduits extending outwardly from the said chamber, a set of radially extending conduits having their inner ends turned upwardly and terminating at the top of the dasher, a dasher rod, and a mechanism for rotating the dasher alternately in opposite directions.

7. In a churn, a dasher having a central chamber opening downwardly, two sets of radially extending conduits arranged in staggered relation, one set communicating with the said chamber and the other set having their inner ends open at the top side of the dasher, a dasher rod connected with the dasher, and means for rotating the dasher rod alternately in opposite directions.

8. In a churn, a dasher composed of two sections, a plurality of passages formed partly in one section and partly in the other, the inner ends of half of the passages opening downwardly and the inner ends of the other passages opening upwardly, means for detachably securing the sections together, a dasher shaft connected with the dasher, and a mechanism for actuating the shaft.

In testimony that I claim the foregoing as my own, I have hereto affixed my signature in the presence of two witnesses.

JAMES L. FORBES.

Witnesses:
T. M. McWILLIAMS,
A. B. COXWELL.